United States Patent [19]
Manning

[11] Patent Number: 4,715,630
[45] Date of Patent: * Dec. 29, 1987

[54] ENERGY ABSORBING VEHICLE BUMPER

[75] Inventor: Donald L. Manning, Orchard Lake, Mich.

[73] Assignee: Transpec Inc., Troy, Mich.

[*] Notice: The portion of the term of this patent subsequent to Jul. 1, 2003 has been disclaimed.

[21] Appl. No.: 856,658

[22] Filed: Apr. 28, 1986

[51] Int. Cl.$^4$ .............................................. B60R 19/08
[52] U.S. Cl. ..................................... 293/120; 293/122; 293/102
[58] Field of Search ............... 293/102, 120, 121, 122, 293/126, 132, 155, 151

[56] References Cited

U.S. PATENT DOCUMENTS

| | | | |
|---|---|---|---|
| 3,888,531 | 6/1975 | Straza et al. | 293/132 X |
| 3,938,840 | 2/1976 | Haase et al. | 293/110 |
| 3,938,841 | 2/1976 | Glance et al. | 293/120 |
| 4,076,296 | 2/1978 | Ditto et al. | 293/122 |
| 4,348,042 | 9/1982 | Scrivo | 293/120 |
| 4,509,782 | 4/1985 | Manning | 293/121 |
| 4,586,739 | 5/1986 | Loren et al. | 293/120 |
| 4,597,601 | 7/1986 | Manning | 293/122 |

FOREIGN PATENT DOCUMENTS

| | | | |
|---|---|---|---|
| 0211942 | 12/1983 | Japan | 293/102 |
| 0073343 | 4/1984 | Japan | 293/102 |
| 0084647 | 5/1984 | Japan | 293/132 |

Primary Examiner—Robert B. Reeves
Assistant Examiner—Russell D. Stormer
Attorney, Agent, or Firm—Reising, Ethington, Barnard, Perry & Milton

[57] ABSTRACT

The bumper system of the present invention is of a modular design wherein two substantially identical, laterally extending members are secured at the laterally innermost ends to define an integrated bumper device and wherein each module is formed of three preformed and structurally self-supporting elements adapted to be nested together and adhesively secured to form an integrated module including an elastomeric outer shell open at its rear most face, an energy absorbing hollow core element formed of a relatively rigid, though deflectable, high strength plastic material adapted to nest within the outer shell in abutting relationship with the relatively stiff transverse support beam adapted to abut against the hollow core element and enclose the open rear face of the outer shell and which beam and hollow core element have coacting faces formed to resist relative impact-induced movement therebetween.

4 Claims, 11 Drawing Figures

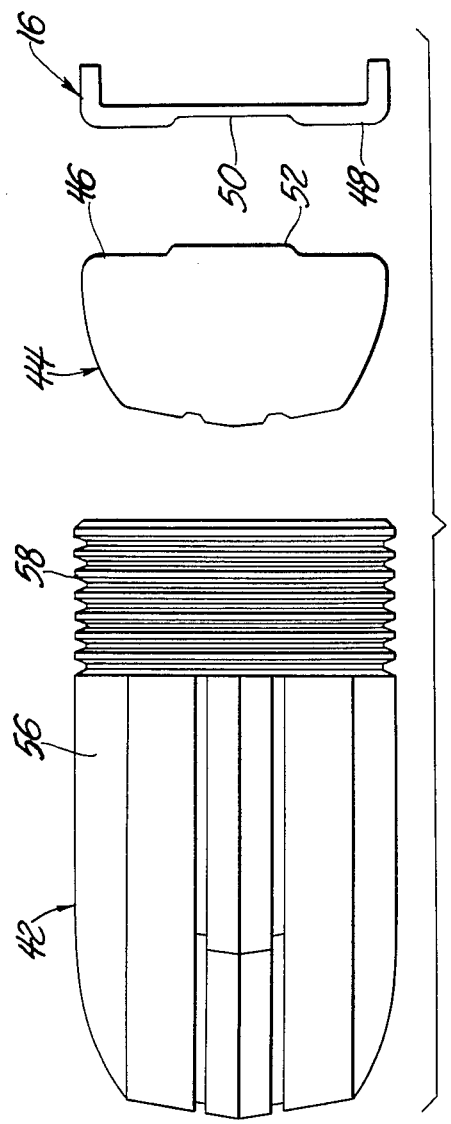
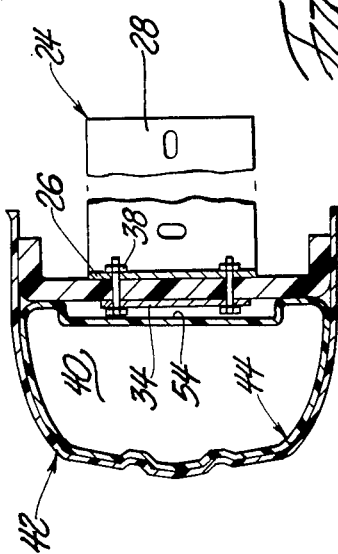

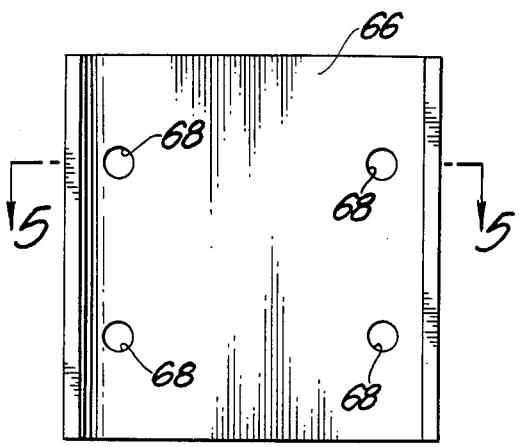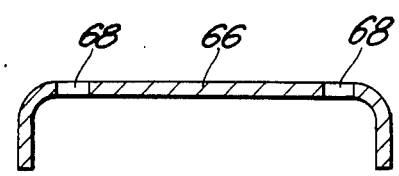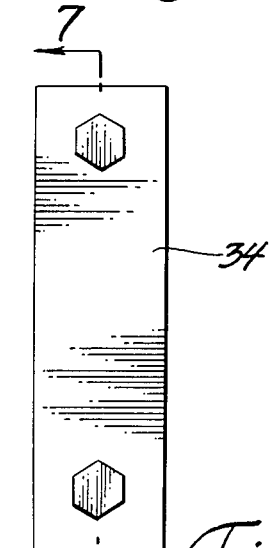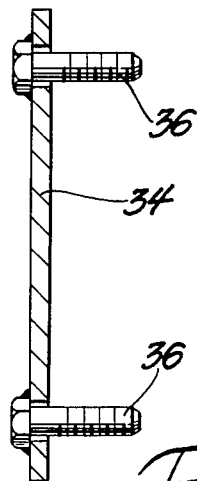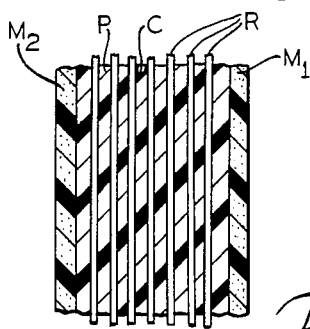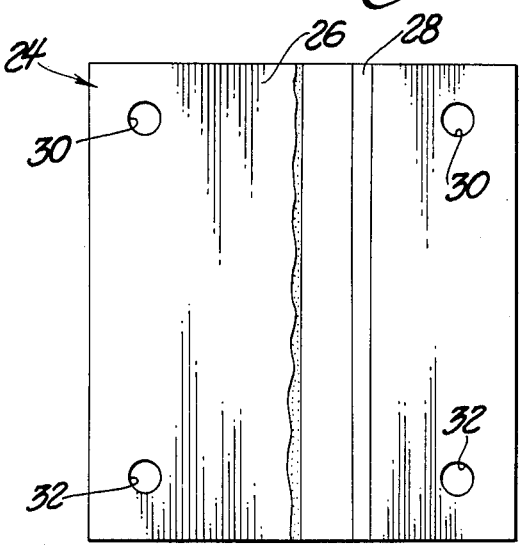

ENERGY ABSORBING VEHICLE BUMPER

TECHNICAL FIELD

The subject matter of the present invention is an energy absorbing vehicle bumper of a type useful with heavy duty vehicles and particularly on buses. The bumper system of the present invention is generally of the type wherein an energy absorbing, hollow core element is formed of a relatively rigid, though deflectable, high strength plastic material and which element is mounted in front of and upon a relatively stiff transverse support beam member which is, in turn, adapted to be secured to a vehicle frame through a suitable rearwardly extending bracket structure.

Most current bus bumper systems are designed to withstand essentially the same type of collision requirements under conditions which will prevent damage to the bus or vehicle as well as to the bumper system. However, the specific manner in which such bumper systems have been constructed varies considerably one from the other and, in general, have resulted in complicated, costly, and in many cases, relatively heavy systems.

It is the purpose of the present invention to provide a greatly simplified bumper system and one which is significantly lighter than systems able to withstand comparable collision impact forces.

While the bumper system of the present invention is greatly simplified and of considerably reduced weight, it is intended to meet the following typical performance standards for a front or rear mounted bus bumper: (1) it shall withstand permanent damage and bumper component deterioration when impacted repeatedly into a fixed, full-height barrier at not less than 5 m.p.h.; (2) it shall be capable of withstanding a 5 m.p.h. impact into a fixed, full-height barrier without damage to the bus or to the energy absorbing bumper system; (3) the bumper system shall be capable of withstanding a 10 m.p.h. head-on impact by a 4,000 lb. post-1973 U.S. type passenger car without damage to the stopped bus, the energy absorbing bumper system or the car; (4) the bumper system shall be capable of withstanding an 8 m.p.h. impact by a 4,000 lb. post-1973 U.S. type passenger at a 30° angle with no damage to the bus; and (5) the front bumper shall be capable of withstanding a 25 m.p.h. impact by the bus into the rear of a 4,000 lb. post-1973 U.S. type passenger car without damage to the bus structure or to the energy absorbing bumper.

BACKGROUND ART

While heavy duty bumper systems have been built which are capable of meeting the above noted collision impact requirements, they have normally be relatively complicated of design and therefore costly to manufacture as well as being heavier than is to be desired.

The present bumper system is a companion to the ones shown in my application Ser. No. 528,403 "Energy Absorbing Vehicle Bumper" filed Sept. 1, 1983, now U.S. Pat. No. 4,590,782 and Ser. No. 712,854 "Energy Absorbing Vehicle Bumper" filed Mar. 18, 1985, now U.S. Pat. No. 4,597,601. It has been found that by using a relatively rigid, though deflectable, hollow core element formed of a high strength plastic in place of a resilient foam core material several advantages inhere. First, by utilizing a unique core element design the bumper system can absorb higher impact loads before experiencing damage to system components. More specifically, the present bumper system can absorb higher impact loads than my earlier systems before breaking or rupturing the energy absorbing core element. Further the components of the subject invention have been configured in a way as to better resist shearing forces which occur between the primary adhered faces of the coacting beam and hollow core element.

In addition, the following patents are illustrative of bumper systems which have been designed to perform in environments similar to that of the subject invention:

3,897,095: "Resilient Bumper Assembly"—Glance et al 3,902,748: "Pneumatic Energy Absorbing Bumper System For Motor Vehicles"—Bank et al 3,989,292: "Semi-Pneumatic Energy Absorbing Bumper System For Motor Vehicles"—Bank et al 4,103,951: "Semi-Pneumatic Energy Absorbing Bumper System For Motor Vehicles"—Bank et al None of the foregoing structures disclose or suggest applicant's unique bumper system.

DISCLOSURE OF THE INVENTION

The subject invention generally relates to an energy absorbing vehicle bumper system of the type including horizontally extending support beam means intended to span the width of the vehicle such as a bus. Bracket members are provided for mounting the bumper system to the vehicle. Energy absorbing means are mounted upon the beam on the front side thereof and opposite from the bracket members. The energy absorbing means includes a relatively rigid, though deformable, hollow core element molded from a high strength plastic material and which core element is nested within an elastomeric outer shell. The subject bumper system includes several unique features. First, the three principal elements of each bumper module, i.e. the elastomeric outer shell, the deformable hollow core element and the transverse beam member, are independently formed and self supporting elements which are assembled in a nested and mutually adhered relationship to form the module. This arrangement is to be distinguished from my prior applications wherein an outer elastomeric skin was molded about the sub assembled support beam and hollow core element. It has been found much more satisfactory to provide a premolded elastomeric outer shell, then, sequentially inserting or nesting and adhering first the core element finally the beam element. As in my aforementioned companion application, the support beam means comprise a pair of identical and, therefore, modular beam members adapted to be centrally joined at their horizontally inner ends. Each support beam has a generally U-shaped cross-section which includes a vertical wall portion and a pair of short horizontal leg portions which project rearwardly from the upper and lower edges of the vertical portion. The hollow core element is inserted or nested within the similarly shaped and sized elastomeric shell with the coacting faces of the shell and core element being adhesively bonded. As the final step in the assembly, the support beam is also inserted or nested within the outer shell so that the front face of the beam is adhered to the rear face of the core element and with the coacting faces of the beam and outer shell also being adhesively bonded. Again as shown in my aforementioned copending application, suitable bolt members are supported upon each beam member such that their threaded shanks project rearwardly through aligned holes in the vertical wall portion of the beam and an associated bracket.

The preferred materials for the components of the subject bumper system are preferably the same as those described in my companion application U.S. Ser. No. 712,854. In other words, the outer shell is preferably formed of a material such as neoprene, high density urethane, or the like. The support beam is formed of a composite reinforced plastic material and preferably made by the "pultrusion" process. Again, while other high strength or engineered plastic materials which are both relatively rigid and yet deflectable may be used for the core element, the preferred material is a polycarbonate/polybutylene terephthalate alloy developed and marketed by General Electric under the trademark XENOY.

Another important feature of the subject invention not shown in the prior art or in my earlier companion applications is in forming the coacting and adhered faces of the support beam and core element in a way as to better resist the shearing forces across these faces when the bumper is subjected to impact loads which otherwise tend to separate the module elements. Specifically, this result is achieved by providing coacting recesses and projections in the coacting faces of the beam and core element. Thus, after the module components are assembled, the projections extend within the recesses thereby resisting relative sliding action between the coacting faces as might be imposed by a shearing action occasioned by bumper impact.

Other features as well as the details of the invention are set forth in the drawings and the description which follows:

BRIEF DESCRIPTION OF DRAWINGS

FIG. 2 is an end view along lines 2—2 of FIG. 1 showing the module components in an unassembled state;

FIG. 3 is a view along lines 3—3 of FIG. 1;

FIG. 4 is a view of the module joining plate;

FIG. 5 is a view along lines 5—5 of FIG. 4;

FIG. 6 is a view of one of the beam mounting bolt plates with studs;

FIG. 7 is a view along lines 7—7 of FIG. 6;

FIG. 8 is a schematic representation of the cross-sectional construction of the pultruded support beam;

FIG. 9 is a view of a bumper supporting bracket;

BEST MODE FOR CARRYING OUT THE INVENTION

Figure 1:
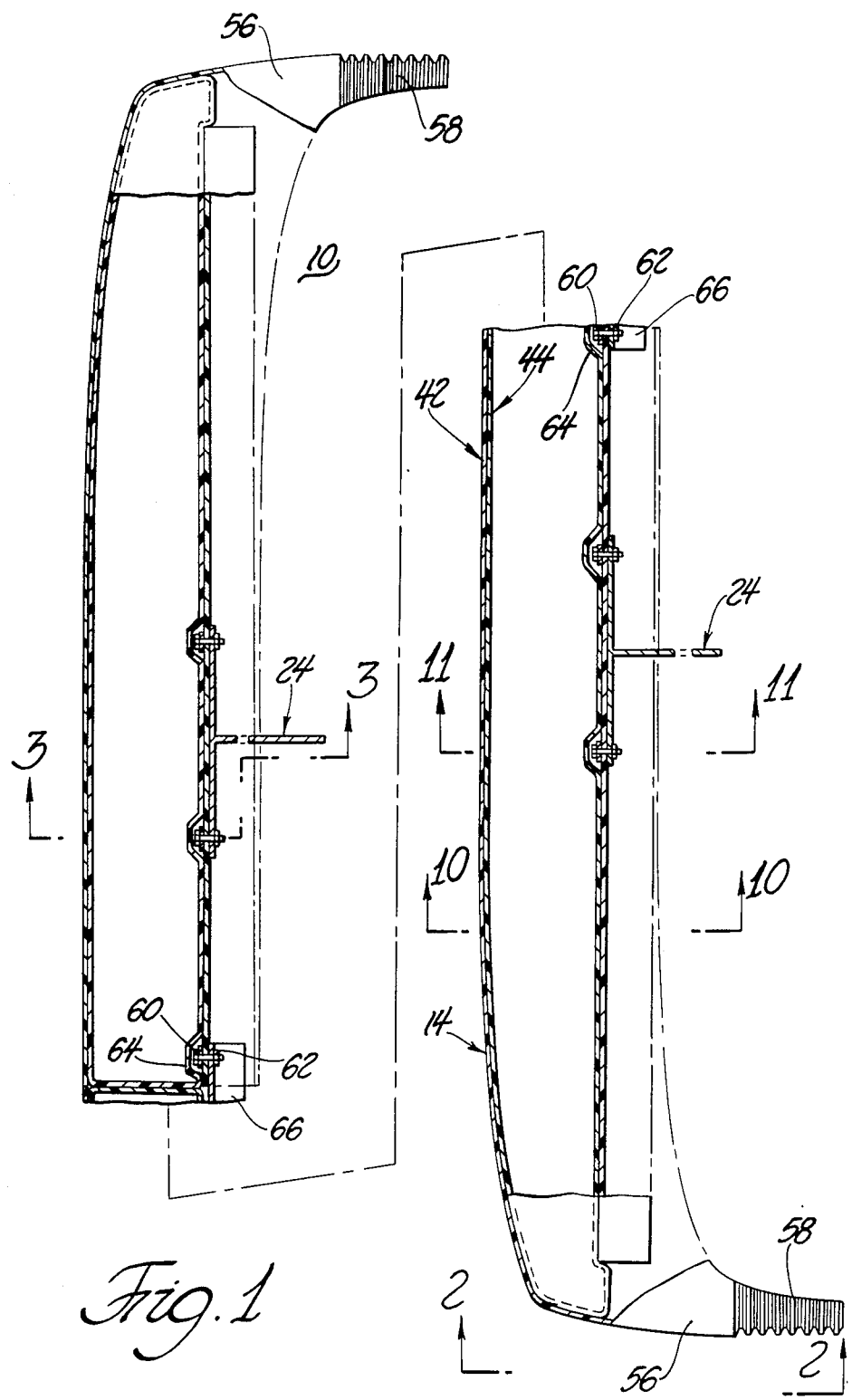
FIG. 1 is a partially sectioned plan view of the bumper structure.
Figure 10:
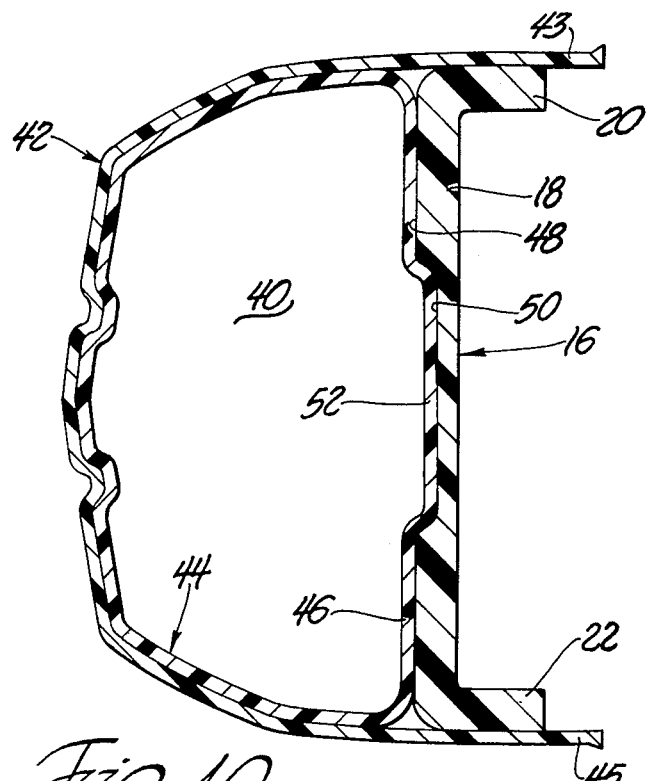
FIG. 10 is a view along lines 10—10 of FIG. 1.
Figure 11:
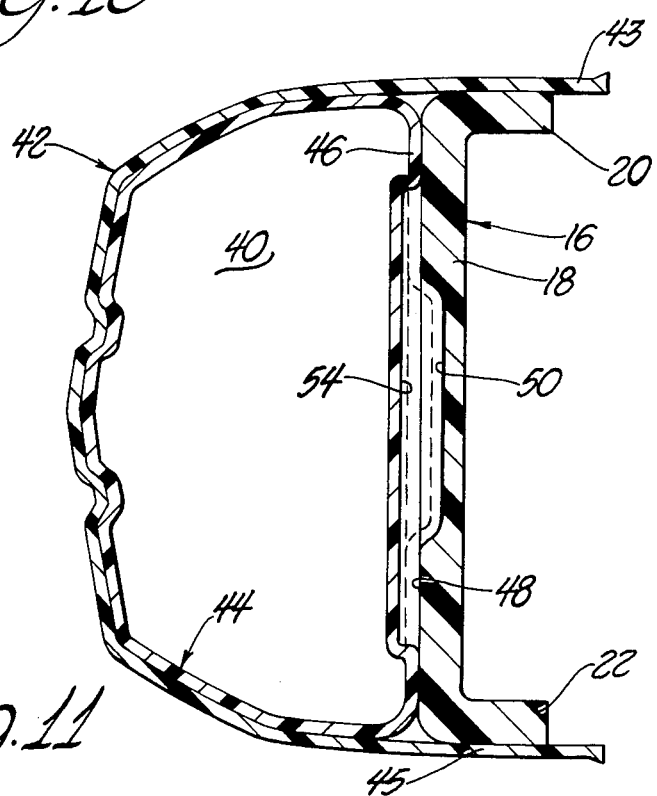
FIG. 11 is a view along lines 11—11 of FIG. 1.

While the system may be used for any heavy duty vehicle, it will hereinafter be referred to as being used with a bus. Referring particularly to FIGS. 1 through 3, the bumper system is indicated generally at 10 and is comprised of two substantially identical module portions 12 and 14 adapted to be suitably joined centrally to form an integrated bumper system adapted to span the front of a bus. In as much as the bumper modules 12 and 14 are substantially identical, only one module will be described and identical parts carry the same number. Each bumper module includes a C-shaped support beam 16 which, as best seen in FIGS. 2, 10 and 11, includes a central wall portion 18 adapted to be mounted in a vertical position and pair of relatively short leg portions 20 and 22 adapted to project horizontally rearwardly from the upper and lower ends of the vertical wall portions.

Each bumper module 12 and 14 is adapted to be mounted to the bus frame structure, not shown, through an appropriate bracket member 24. Referring to FIGS. 3 and 9, bracket member 24 is generally of a T-shape and includes a top or forward portion 26 and a central leg portion 28. Bracket portions 26 and 28 are adapted to be mounted in a vertical position. As seen in FIG. 9, bracket portion 26 includes two sets of vertically spaced holes 30 and 32 formed therethrough and transversely spaced on either side of leg portion 28. Corresponding holes are formed through the vertical wall portion 18 of support beam 16. When bracket 24 is secured to the appropriate bus frame structure through leg portion 28, said leg portion extends rearwardly substantially parallel to the longitudinal axis of the vehicle.

As best seen in FIGS. 1, 3 and 7, a vertically disposed metal strip plate 34 has threaded bolt members 36 tack welded or otherwise affixed thereto such that a pair of the plates abuts against the forward face of the support beam wall portion 18 with the threaded shanks of the bolts projecting through the aligned beam and bracket holes such that the bracket member 24 may be joined to the bumper module by suitable nut means 38.

The bumper impact forces are transmitted through the energy absorbing structure, indicated generally at 40, to the deflectable support beam 16 and bracket 24 to the vehicle frame. The energy absorbing bumper structure includes an elastomeric outer shell 42 within which beam 16 and a hollow core element 44 are adhesively bonded.

Rather than being molded about the preassembled support beam and hollow core element, as in my companion application U.S. Ser. No. 712,854, the elastomeric shell 42 is premolded as to form a free standing element into which beam 16 and core element 44 can be nested as will subsequently be described. Elastomeric shell 42 is formed of any suitable elastomeric material such as neoprene, high density urethane, or the like and must be of such a quality and thickness as to resist puncturing by the impingement of a one fourth inch spherically radiused rod thrust endwise into the bumper with a thrust of not less than 350 lbs. In the illustrated embodiment, outer shell 42 has a thickness of about 3/16 inch. A most satisfactory material is a self-skinning urethane having a density of 60 pounds per cubic foot. One such material is available from Mobay Chemical and is identified as 11-25. While other features of the outer shell 42 will be described in conjunction with the description of core element 44, as best seen in FIGS. 10 and 11, the outer shell is premolded and has a generally C-shaped cross-section including leg portions 43 and 45 which define a rearwardly facing opening.

The details of the energy absorbing core element 44 may best be appreciated by particular reference to FIGS. 3, 10 and 11. Core element 44 is formed of a high strength plastic material having the physical characteristic of being both rigidified and yet being deflectable under impact loads as during a collision. A preferred material for this application is a polycarbonate/polybutylene terephthalate alloy which is a proprietary material developed by the General Electric Corporation and marketed under the trade name XENOY. The typical properties for this material are as follows:

Specific Gravity: 1.19

Specific Volume, In $^3$/LB: 23.2

Tensile Strength, PSI: 7,000
Flexural Strength, PSI: 10,000
Flexural Modulus, PSI: 290,000
Notched Izod, FT-LBS/In
 @ Room Temperature: 13
 @ −30° C.: 10
Gardner Impact, In-LBS
 @ Room Temperature: 400
 @ −30° C.: 400

In the embodiment of the invention shown in the drawings, the wall thickness of element 44 is in the range of 0.200 to 0.300 inches. The hollow core element 44 is formed by the blow molding process which results, at least initially, in an integral and completely enclosed structure.

It has been found under certain collision impact situations, as when the impacting force is at an angle to the bumper, a shear force is transmitted through the energy absorbing system in a way which tends to cause the hollow core element 44 to be displaced relative to the coacting and supporting face of the transverse beam 16. More specifically, the hollow core element 44 includes a rear wall 46 which is adapted to be adhered to the front face of the vertical wall portion 18 of support beam 16. If a bumper impact force engages the outer shell member 42 generally perpendicular to support beam 16, then, there are generally no shear forces tending to slide or displace the hollow core element 44 relative to support beam 16. However, should the impact force impinge against the outer shell 42 at an angle other than perpendicularly as just described, a shear force is introduced tending to slide or displace the hollow core element 44 relative to support beam 16. It is to avoid this displacement or sliding tendency between the core element and the support beam that additional features have been introduced into the construction of the element.

The generic idea involved in resisting the aforementioned sliding movement between the core element and support beams is to provide respective recesses and projections in the coacting faces of the core elements and support beam such that when the module is assembled the projections and recesses nest to resist such sliding movement. More specifically and in the modification shown, as in FIGS. 3, 10 and 11, the front face 48 of the vertical portion 18 of support beam 16 is provided with a recessed portion 50. In this particular modification, the recess 50 may take the form of a channel or slot extending substantially throughout the lateral extent of the support beam 16.

The rear face 46 of the hollow core element is formed with a projecting portion 52 which generally corresponds in shape and size to recess or channel 50 formed in the support beam. Thus, in this modification, the projection 52 would extend substantially throughout the lateral extent of the hollow core element 44. It is obvious that the channel and projection relationship could be reversed with the channel being formed in the hollow core element and the projection on the support beam.

It is also to be understood that rather than an essentially continuous channel and projection relationship, the hollow core element and support beam could be provided with a plurality of coacting recesses and projections which when mutually nested and faces 46 and 48 bonded sliding between beam 16 and core element 44 will be resisted.

As already noted, fastening means are provided for mounting transverse beam 16 to the vehicle body through T-shaped support bracket 24. As best seen in FIGS. 1, 3 and 11, the rear wall 46 of hollow core element 44 is provided with a vertically extending recess 54 which projects within the hollow core element and is adapted to accommodate the heads of bolts 36 and bolt support plate 34. If rear wall projection 52 extends substantially throughout the lateral extent of the hollow core element, then, the continuous nature of the projection 52 will be periodically interrupted by the bolt plate accommodating recesses 54.

In order to provide protection for the side of the bus in the area of the bumper, each module is molded with a trailing or cantilevered portion 56 formed at the outer most end thereof in such a way as to project rearwardly of the vehicle. As in my companion application, the rear most section of trailing portion 56 has been corrugated as at 58 whereby the length of the trailing portion may be reduced by cutting off any unneeded portion thereof. As best seen in FIG. 1, the transverse outer ends of shell 42 project laterally beyond support beam 16 and thereby protect the front corners of the bus.

In order to join the bumper modules 12 and 14, suitable holes are formed through the vertical wall portions 18 of the support beams adjacent their horizontally innermost ends. Strip-mounted bolts 60, substantially identical to 34 and 36 described above, project rearwardly through holes in beam 16 so that their threaded shank portions may be engaged by suitable nut elements 62. Once again, recesses 64 are formed in the rear wall 46 of the hollow core element to accommodate the bolts 60. As best seen in FIGS. 4 and 5, a C-shaped plate 66 is provided for joining the bumper modules at their inner ends. Holes 68 are formed in plate 66 and correspond to similar holes in beam 16 and are adapted to receive bolts 60 which project rearwardly to be engaged by the nut elements 62 thereby integrally joining the modules.

PREFERRED EMBODIMENT

The ultimate objective of the subject bumper system is to achieve the lightest weight and simplest structure able to withstand the required, supra, collision impact loads in a manner to avoid damage to the system and the vehicle. In view of its numerous advantages, including weight and strength, as compared to other high strength materials, it is most preferred to use a fiberglass reinforced plastic material for the support beam members 16. More specifically, such a material is preferably made by the well-known "pultrusion" process. Referring to the schematic representation of FIG. 8, the support beam material comprises a thermo setting resin, e.g. polyester, impregnated fiberglass laminated composite having a core element C and outer layers $M_1$ and $M_2$. Core element C consists of a plurality of linear and generally parallel roving elements R which extend along the transverse length of beam 16. Core element C comprises approximately 75% of the thickness of the beam material. The outer overlaying layers $M_1$ and $M_2$ are of a mat or woven construction. Each of the layers $M_1$ and $M_2$ comprises approximately 12.5% of the thickness of the composite beam material. Core C and outer layers and $M_1$ and $M_2$ are completely impregnated with a thermal setting resin P, supra, to provide a suitable composite matrix.

In the preferred embodiment, the overall cross-section thickness of the composite beam material is approximately 0.625 inch. Dimensionally, the vertical wall portion 18 of beam 16 is approximately 10 inches while leg portions 20 and 322 are approximately 3 inches in length.

Referring to FIG. 3, the energy absorbing member 40 and shell 42 project about 8 inches beyond or forwardly of the vertical wall portion 18 of beam 16.

While the transverse length of the bumper is determined by the bus width, each bumper module 12 and 14 is typically 48 to 51 inches in length. Sometimes the front end shape of the bus dictates that the bumper modules be angled with respect to each other in which event the bumper module joining plate 66 will be formed in appropriate angle e.g. 6° in both directions from its horizontal midpoint.

In the preferred embodiment the various brackets and support plates are preferably formed of ⅜ inch steel.

Exclusive of external bracketry and mounting hardware, the lightest energy absorbing bus bumpers have heretofore weighed about 160 lbs. The subject bumper weighs approximately 130 lbs or is about 25% lighter than known bumpers when built as depicted in the preferred embodiment.

It is apparent that other modifications of the energy absorbing bumper system may be made within the intended scope of the invention as set forth in the hereinafter appended claims.

What is claimed is:

1. An energy absorbing vehicle bumper system of the type including a pair of identical beam members (16) adapted to be joined by a common plate member (66) at their horizontally inner ends to provide a bumper support structure for spanning the front end of a vehicle, bracket means (24) for mounting said beams to the vehicle, and energy absorbing means supported upon said beam on the side thereof opposite from the bracket means, said energy absorbing means including a deflectable member (44) enclosed by an elastomeric outer cover means (42), the improvement comprising:
   A. each beam (16) having
      (1) a generally U-shaped cross-section with a vertical wall portion (18);
      (2) a pair of horizontal leg portions (20 and 22) projecting rearwardly from the upper and lower edges of the vertical wall portion and away from said energy absorbing means;
      (3) said vertical wall portion (18) including a front face (48) proximate said energy absorbing means;
   B. the energy absorbing means comprising a hollow, rigidified and deflectable structural member (44) having a rear wall (46) secured to the front face (48) of the vertical wall portion (18) of said beam member;
   C. the abuttingly adjacent front face (48) of beam (16) and rearwall (46) of hollow member (44) being formed to provide coacting recesses and projections (50 and 52) to resist relative sliding movement between beam (16) and member (44);
   D. fastening means (36) for securing said beam members to said bracket means; and
   E. said elastomeric cover means (42) enclosing the energy absorbing means and at least a portion of the cooperating beam member.

2. An energy absorbing vehicle bumper system of the type including a pair of identical beam members (16) adapted to be joined by a common plate member (66) at their horizontally inner ends to provide a bumper support structure for spanning the front end of a vehicle, bracket means (24) for mounting said beams to the vehicle, and energy absorbing means supported upon said beam on the side thereof opposite from the bracket means, said energy absorbing means including a deflectable member (44) enclosed by an elastomeric outer cover means (42), the improvement comprising:
   A. said elastomeric cover means (42) being a pre-molded and structurally self-supporting member having a generally C-shaped cross-section and including leg portions (43 and 45) extending horizontally to provide an open end facing said bracket means (24);
   B. the energy absorbing means being a pre-molded, rigidified and deflectable structural member having a rear wall (46);
   C. each beam (16) having
      (1) a generally U-shaped cross-section with a vertical wall portion (18) having a front face (48) abuttingly engaging and adhesively bonded to said rear wall (46);
      (2) a pair of horizontal leg portions (20 and 22) projecting rearwardly from the upper and lower edges of the vertical wall portion (18) and away from said energy absorbing means;
   D. the abuttingly adjacent front face (48) of beam (16) and rear wall (46) of hollow member (44) being formed to provide coacting recesses and projections (50 and 52) to resist relative sliding movement between beam (16 and 44);
   E. fastening means (36) for securing said beam members to said bracket means; and
   F. the leg portions (43 and 45) of said elastomeric cover means being adhesively bonded to the leg portions (20 and 22) of said beam member.

3. An energy absorbing vehicle bumper system of the type including a pair of identical beam members (16) adapted to be joined by a common plate member (66) at their horizontally inner ends to provide a bumper support structure for spanning the front end of a vehicle, bracket means (24) for mounting said beams to the vehicle, and energy absorbing means supported upon said beam on the side thereof opposite from the bracket means, said energy absorbing means including a hollow, rigidified and deflectable member (44) enclosed by an elastomeric outer cover means (42), the improvement comprising:
   A. each beam (16) having
      (1) a generally U-shaped cross-section with a vertical wall portion (18);
      (2) a pair of horizontal leg portions (20 and 22) projecting rearwardly from the upper and lower edges of the vertical wall portion and lower edges of the vertical wall portion and away from said energy absorbing means;
      (3) said vertical wall portion (18) including a front face (48) proximate said deflectable member (44) and a channel (50) rearwardly recessed from said face intermediate said horizontal leg portions (20 and 22), said channel extending substantially continuously throughout the lateral length of said beam;
   B. member (44) having a rear wall (46) adhesively bonded to front face (48) of the vertical wall portion (18) of said beam member; said rear wall including a rearwardly projecting ridge (52) extending substantially continuously through the lateral length of said wall, said ridge generally corresponding in shape and size to said beam channel (50), said ridge projecting within said beam channel to vertically align and to resist relative vertical movement between the rear wall (46) of said energy absorbing means and said beam;
C. fastening means (36) for securing said beam members to said bracket means; and
D. said elastomeric cover means (42) enclosing the energy absorbing means and at least a portion of the cooperating beam member.

4. An energy absorbing vehicle bumper system of the type including a pair of identical beam members (16) adapted to be joined by a common plate member (66) at their horizontally inner ends to provide a bumper support structure for spanning the front end of a vehicle, bracket means (24) for mounting said beams to the vehicle, and energy absorbing means supported upon said beam on the side thereof opposite from the bracket means, said energy absorbing means including a hollow, rigidified and deflectable member (44) enclosed by an elastomeric outer cover means (42), the improvement comprising:
A. said elastomeric cover means (42) being a premolded and structurally self-supporting member having a generally C-shaped cross-section and including leg portions (43 and 45) extending horizontally to provide an open end facing said bracket means (24);
B. member 44 having a rear wall (46); said wall including an outwardly projecting ridge (52);
C. each beam (16) having
   (1) a generally U-shaped cross-section with a vertical wall portion (18);
   (2) a pair of horizontal leg portions (20 and 22) projecting rearwardly from the upper and lower edges of the vertical wall portion and away from said energy absorbing means;
   (3) said vertical wall portion (18) including a front face (48) and a channel (50) rearwardly recessed from said face intermediate said horizontal leg portions (20 and 22), said channel corresponding in shape and size to the ridge (52) which projects within said channel to vertically align and to resist relative vertical movement between the rear wall (46) of the energy absorbing means and said beam; said rear wall (44) being adhesively bonded to the front face (48) of said beam;
D. fastening means (36) for securing said beam members to said bracket means; and
E. the leg portions (43 and 45) of said elastomeric cover means being adhesively bonded to the leg portions (20 and 22) of said beam member.

* * * * *